United States Patent Office 3,196,901
Patented July 27, 1965

3,196,901
RATIO PRESSURE REDUCING VALVE
Malcolm T. Phillipps, Hilton, South Australia, Australia, assignor to Philmac Limited, Hilton, South Australia, Australia
Filed Sept. 14, 1962, Ser. No. 223,656
Claims priority, application Australia, Sept. 18, 1961, 9,268/61
2 Claims. (Cl. 137—494)

This invention relates to a valve suitable for use in a fluid flow line for reducing the pressure.

In many applications it is desirable to reduce pressure in a fluid flow line, for example in an air line or water line, and a number of different types of valves have been proposed to provide pressure reducing or controlling means. Many of the previously proposed valves function on the principle of reducing the pressure to a given fixed pressure which is adjustably varied by means of a spring or other similar device. Under most circumstances, however, it is unnecessary to reduce the pressure to a fixed value, and in the case of a water flow line for example, most of the requirements of an application will be met by a pressure reducing valve where the pressure upon no-flow on the low pressure side is a function of the pressure on the high pressure side.

One of the problems which is encountered with pressure reducing valves is a tendency for voids to form within the valve, and upon collapse of these voids noise is emitted. In some cases this noise approaches what is commonly termed a "scream."

An object of this invention is to provide a valve wherein the noise level is not objectionably high. A second object is to provide a valve which is reliable, although low in cost and simple in construction. A still further object of the invention is to provide a valve which is dimensionally small for a high capacity.

In its simplest form the invention may be said to consist of a valve comprising a hollow body, a smaller diameter inner annular surface within said body intermediate its ends and a larger diameter inner annular surface within said body and disposed towards one end, an annular surface within said body and disposed towards the opposite end, an annular valve seat in the hollow body disposed towards its inlet end, a valve member in the hollow body, a larger diameter piston on the valve member slidably and sealably engaging said larger diameter inner annular surface, a smaller diameter piston on the valve member slidably and sealably engaging said smaller diameter inner annular surface, the inlet end on said smaller diameter piston cooperating with said valve seat to open or close the valve upon axial movement of the valve member, and a passage in the valve communicating with a low-pressure space adjacent to the upper surface of the larger diameter piston and at the other end into a pressure release space adjacent the valve seat.

Figure 1:
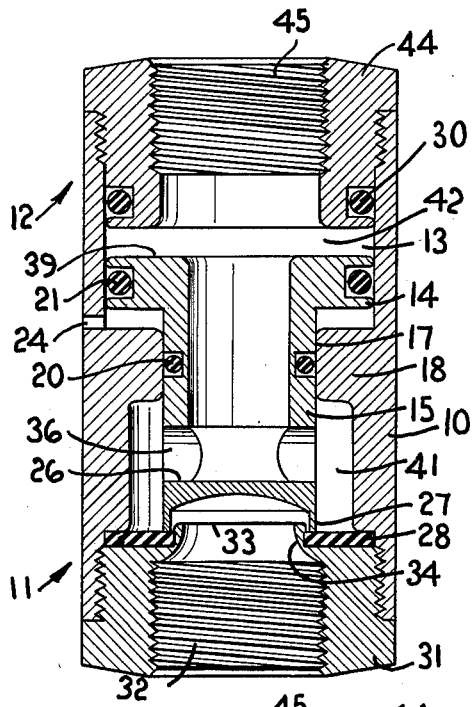
Figure 2:
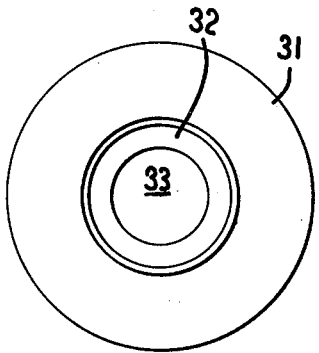
Figure 3:
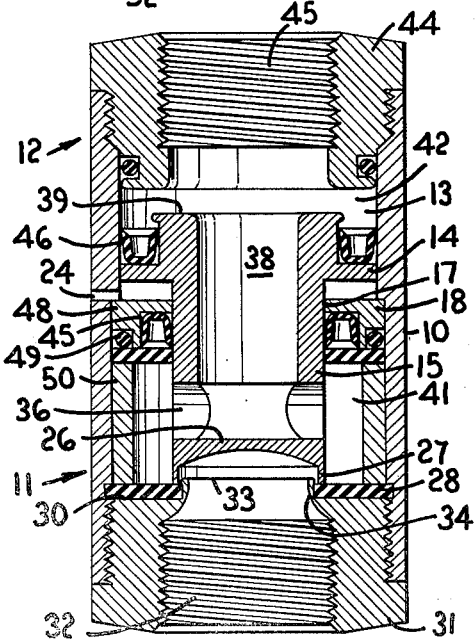

An embodiment of the invention is described herein in some detail with reference to and is illustrated in the accompanying drawings, in which:

FIG. 1 is a central section through a typical pressure-reducing valve of a small size, but drawn to a large scale, FIG. 2 is a plan view of the valve of FIG. 1, and FIG. 3 is a central section through a typical valve of larger size, also drawn to an enlarged scale.

According to the embodiment of FIGS. 1 and 2 a valve body 10 is hollow and has one portion 11 which constitutes a high pressure or inlet end and another portion 12 which constitutes a low pressure or discharge end, the low pressure end 12 being formed with a larger diameter inner cylindrical surface 13 which is slidably engaged by a larger diameter piston 14 which together with a smaller diameter piston 15 constitutes a valve member. The smaller diameter piston 15 is in this embodiment a sliding sleeve. The sliding sleeve piston 15 extends downwardly into the high pressure end 11, the piston 15 sliding within a smaller diameter inner cylindrical surface 17 formed by the inwardly extending flange 18 of the hollow valve body 10.

A pair of O rings 20 and 21 are disposed in slots in the smaller diameter piston 15 and larger diameter piston 14 respectively, a larger O ring being disposed on the larger diameter piston so that the larger diameter piston 14 sealably engages the larger diameter cylindrical surface 13 of the low pressure end 12 of the valve body 10. Between the larger diameter piston 14 and the inwardly extending flange 18, an aperture 24 is provided which is communicative with the atmosphere for inflow or outflow of air below the larger piston 14. The smaller diameter piston 15 with its O ring 20 thereon sealably engages the smaller diameter cylindrical surface 17 of the valve body 10, and terminates in a closed end 26 formed with a recessed seating rim 27 at the high pressure or inlet end adapted to open away from or to close upon a resilient seat 28 in the valve body 10 upon axial movement of the valve member.

The inlet of the high pressure or inlet end 11 of the body 10 has a bush 31 screwed into it, the bush 31 retaining the resilient valve seat 28. The bush 31 has an internally threaded portion 32 which forms an inlet port, and the inlet port merges into the valve aperture 33 with a curved wall 34 thereby reducing turbulence and limiting noise. The end of the valve member having the annular peripheral seating rim 27 thereon engages the valve seat 28 over a small area, this being desirable to limit the mechanical effort necessary to produce positive closure. The rim 27 is narrow and the area of the aperture 33 is nearly equal to the cross-sectional area of the piston 15. This reduces the tendency for the thrust lifting the rim 27 from the seat 28 to increase upon initial movement of the piston 15, in turn reducing tendency to vibrate.

A transverse opening 36 extends through the smaller diameter piston 15 above its closed end 26 to provide communication with an axial passage 38 which passes through the valve member and opens in the end 39 of the larger diameter piston 14 to thereby connect the pressure release space 41 adjacent the valve seat 28 with the low-pressure space 42 adjacent the end of the larger diameter piston. As shown in the drawing, the cross-sectional areas of the opening 36 and axial passage 38 are large so that the pressure drop across the valve is gradual from the high pressure end to the low pressure end. An outlet member 44 is screwed into the low-pressure end of the hollow valve body 10 and is provided with an O ring seal 30 and has an axial opening 45 which is threaded, and this constitutes an outlet or discharge port for the valve.

The annular release space 41 provides a passageway for flow of fluid between the seating rim 27 of the valve member and the valve seat 28 at the high pressure end 11 of the body 10, the pressure release passageway consisting of a recess in the valve body 10 leading to the transverse opening 36 through the passage 38 in the valve member.

The embodiment of FIG. 3 is substantially similar to the embodiment of FIGS. 1 and 2, the main difference being that the U section packing rings 45 and 46 replace the O rings 20 and 21 respectively, these having less friction than O rings, so that this arrangement is suitable for large size valves. The smaller diameter inner cylindrical surface in this embodiment is defined by a piston engaging sleeve 48 in combination with the packing ring 45, the sleeve 48 being sealed against the inner walls of the outer tubular member 10 by the O ring 49, and retained in place by the spacer sleeve 50. The sleeve 50 then defines the outer cylindrical wall of the pressure release space 41.

In the embodiment of FIG. 3 similar numbers indicate corresponding parts of the first embodiment of FIGS. 1 and 2.

The manner in which the valve functions is as follows:

Assuming the valve to be disposed in a water line in which there is no flow, the pressure urging the valve member towards a closed position is the pressure operable upon the upper surface of the larger diameter piston surrounding the axially extending passage. The pressure urging the valve member away from its seat is the pressure operating against the end surface of the smaller diameter piston. When these two forces are equal the sliding valve piston is at rest, but if it is at rest with the seating rim away from the valve seat, liquid flow passes from the inlet port through the pressure release area and the passage in the valve member to become operable on the larger diameter piston head of the sliding sleeve piston, whereupon the thrust tending to close the valve member can become greater than the thrust tending to open it, so that the valve member moves to maintain a differential balance between the high and low pressure areas or will close upon the seating in the event of cessation of flow from the low-pressure or discharge end. Upon commencement of flow of water from the pipe network connected to the outlet port, this balance of thrust is disturbed and the sliding valve member comes under the influence of the high pressure water connected to it through the inlet port, and the valve member moves smoothly away from the valve seat. Water is then free to flow between the valve member and the valve seat, through the passage in the valve member and outwardly through the pipe network connected to the outlet port. During the flow period, the pressure ratio between the high and low-pressure lines is of course greater than when the valve is closed owing to the restriction to flow offered by the valve, but upon cessation of flow this pressure is gradually restored as the sliding sleeve piston moves towards the valve seat. This ability of the valve member to move to a point where it will maintain a differential balance, or to gradually move back onto the valve seat, is due to the seating rim 27 being narrow, so that the effective pressure on the small diameter portion of the valve member does not greatly vary as the rim 27 leaves the seat 28. This feature is essential in water lines to prevent "water hammer," and distinguishes the valve of this invention from previously proposed valves of the pulsatory type.

The invention can be extended if desired by providing a means to load the valve member in either direction, but preferably towards the valve seat, such means for example, consisting of a non-corrosive spring between the larger diameter top of the larger piston in the low-pressure end of the valve body and provided with an adjustable screw device to vary the spring tension.

What I claim is:

1. A ratio pressure reducing valve comprising a hollow cylindrical valve body having opposite ends, said body having an inlet means and an outlet means at said opposite ends, said inlet means and outlet means being coaxial, said body having an inner annular surface intermediate said ends of reduced diameter and a larger diameter inner annular surface at the outlet end, an annular valve seat at the inlet end encircling the inlet means in proximate relation, a valve member slidably arranged in said hollow body, said valve member including a larger diameter piston slidably and sealably engaged with the inner annular surface at the outlet end, and a smaller diameter piston slidably and sealably engaged with the inner annular surface which is intermediate said ends, said valve member defining with said valve body a low pressure space adjacent the end of the larger diameter piston and a pressure release space adjacent the valve seat, said valve member having an axial passage which opens at one end into the low pressure space and a transverse opening in said smaller diameter piston in communication with said axial passage and opening into the pressure release space, said smaller diameter piston having a closed end facing said inlet means in coaxial relation and an axially depending annular rim on the closed end of the piston extending towards the annular valve seat to selectively contact the same and close communication between the inlet means and the pressure release space, whereby upon axial movement of the valve member the valve will be selectively opened and closed, said inlet means having an aperture with a diameter only slightly less than the diameter of the smaller diameter piston and adapted for supplying fluid at a substantially constant pressure for open and closed positions of the valve, said rim being relatively narrow and being peripherally on the closed end of the piston to thereby have a diameter only slightly greater than the diameter of the aperture of the inlet means such that the effective thrust on the end of the smaller diameter piston due to pressure fluid acting thereon is only slightly increased when the rim moves out of contact with the valve seat and the valve is open.

2. A valve as claimed in claim 1 wherein said inlet means comprises a threaded bush in said body, said bush having an inner threaded opening and a curved portion forming said aperture and connecting the opening therewith.

References Cited by the Examiner

UNITED STATES PATENTS

| | | | |
|---|---|---|---|
| 334,326 | 1/86 | Acheson | 137—494 |
| 892,450 | 7/08 | Robinson | 127—505.25 |
| 2,353,161 | 7/44 | Heigis | 137—540 XR |
| 2,436,268 | 2/48 | Schnell | 137—494 XR |

M. CARY NELSON, *Primary Examiner.*

MARTIN P. SCHWADRON, *Examiner.*